US012531855B2

(12) United States Patent
Han

(10) Patent No.: US 12,531,855 B2
(45) Date of Patent: Jan. 20, 2026

(54) INFORMATION PROCESSING SYSTEM, INFORMATION PROCESSING METHOD, AUTHENTICATION SYSTEM, AND PROGRAM

(71) Applicant: GREE, Inc., Tokyo (JP)

(72) Inventor: Gijun Han, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 301 days.

(21) Appl. No.: 18/338,602

(22) Filed: Jun. 21, 2023

(65) Prior Publication Data

US 2024/0205219 A1 Jun. 20, 2024

(30) Foreign Application Priority Data

Dec. 16, 2022 (JP) .................. 2022-201020

(51) Int. Cl.
*H04L 9/40* (2022.01)
(52) U.S. Cl.
CPC .................. *H04L 63/0846* (2013.01)
(58) Field of Classification Search
CPC ......... H04L 63/0846; H04L 63/0838
See application file for complete search history.

(56) References Cited

U.S. PATENT DOCUMENTS 9,197,623 B2 * 11/2015 Srinivasan .......... H04L 63/0815
10,413,238 B1 * 9/2019 Cooper ................ A61B 5/7278
10,715,514 B1 * 7/2020 Threlkeld .......... H04L 63/0807
11,106,634 B1 * 8/2021 Stark .................... H04L 63/108
11,243,977 B2 * 2/2022 Bowman ................ G06F 16/27
11,405,379 B1 * 8/2022 Clauss .................. H04L 63/101
11,477,648 B2 * 10/2022 Kim .................... H04W 12/069
12,219,065 B2 * 2/2025 Chang ................. H04L 63/1433

(Continued)

FOREIGN PATENT DOCUMENTS

JP 2013171496 A 9/2013
JP 5555799 B1 7/2014

(Continued)

OTHER PUBLICATIONS

Office Action issued on Aug. 20, 2024, in corresponding Japanese Application No. 2022-201020, 29 pages.

(Continued)

*Primary Examiner* — Khalid M Almaghayreh
(74) *Attorney, Agent, or Firm* — Maier & Maier, PLLC

(57) ABSTRACT

An information processing device intended to effectively improve the reliability of an authentication process, including: an authentication information acquisition circuit acquiring authentication information; and a code update circuit updating an authentication code readable from the outside or transmittable to the outside for each predetermined cycle, on the basis of the authentication information acquired by the authentication information acquisition circuit, and time information changed in an update cycle shorter than or equal to the predetermined cycle. The predetermined cycle may preferably be 1 second or shorter. In addition, the authentication information acquisition circuit may preferably acquire the authentication information from an external server in the form of a one-time token including a first expiration date with a first length.

16 Claims, 3 Drawing Sheets

(56) References Cited

U.S. PATENT DOCUMENTS

| | | | | |
|---|---|---|---|---|
| 2002/0152411 | A1* | 10/2002 | Olsen | G06F 1/14 |
| | | | | 713/500 |
| 2010/0011413 | A1* | 1/2010 | Banerjee | H04L 63/0807 |
| | | | | 726/2 |
| 2013/0047218 | A1* | 2/2013 | Smith | H04W 12/068 |
| | | | | 726/4 |
| 2013/0221083 | A1* | 8/2013 | Doss | G06F 16/9554 |
| | | | | 235/375 |
| 2015/0032627 | A1* | 1/2015 | Dill | G06Q 20/40 |
| | | | | 705/44 |
| 2015/0134967 | A1* | 5/2015 | Moore | H04L 63/0823 |
| | | | | 713/168 |
| 2015/0312038 | A1* | 10/2015 | Palanisamy | G06Q 20/385 |
| | | | | 713/155 |
| 2015/0334049 | A1* | 11/2015 | Miura | H04L 47/808 |
| | | | | 709/203 |
| 2019/0197231 | A1* | 6/2019 | Meier | H04L 63/0407 |
| 2020/0201679 | A1* | 6/2020 | Wentz | G06F 9/468 |
| 2020/0236100 | A1* | 7/2020 | Kuper | H04L 65/762 |
| 2020/0412556 | A1* | 12/2020 | Yoon | H04L 63/0876 |
| 2021/0157894 | A1 | 5/2021 | Yamagishi et al. | |
| 2021/0307086 | A1 | 9/2021 | Kaisha | |
| 2023/0123781 | A1* | 4/2023 | Kaimal | H04L 67/141 |
| | | | | 726/12 |
| 2024/0179142 | A1* | 5/2024 | Lyu | H04L 63/0815 |

FOREIGN PATENT DOCUMENTS

| | | | | |
|---|---|---|---|---|
| JP | 201635751 | A | | 3/2016 |
| JP | 2020017247 | A * | 1/2020 | H04L 9/3213 |
| JP | 2020181395 | A | | 11/2020 |
| JP | 202147557 | A | | 3/2021 |
| JP | 2021158494 | A | | 10/2021 |
| JP | 2021193510 | A | | 12/2021 |

OTHER PUBLICATIONS

Pretrial Report issued on Jan. 26, 2024, in corresponding Japanese Application No. 2022-201020, 8 pages (English translation only).
Office Action issued on Jun. 6, 2023, in corresponding Japanese Application No. 2022-201020; 6 pages.
Office Action issued on Sep. 19, 2023, in corresponding Japanese Application No. 2022-201020; 8 pages.

* cited by examiner

INFORMATION PROCESSING SYSTEM, INFORMATION PROCESSING METHOD, AUTHENTICATION SYSTEM, AND PROGRAM

FIELD

The present disclosure relates to an information processing system, an information processing method, an authentication system, and a program.

BACKGROUND

As a countermeasure for improving the reliability of an authentication process, it may be contemplated to use a one time password (also referred to as OTP) that is more enhanced than authentication using a password.

SUMMARY

However, in a conventional one time password system, the one time password may be set to have an expiration date that is set to occur in a relatively long time, and thus, it is difficult to further improve the reliability of the process.

Therefore, in one aspect, an object of the disclosure is to effectively improve the reliability of an authentication process.

According to an exemplary embodiment, an information processing device may be provided, which may include: an authentication information acquisition circuit acquiring authentication information; and a code update circuit updating an authentication code readable from the outside or transmittable to the outside for each certain cycle, on the basis of the authentication information, and time information changed in an update cycle shorter than or equal to the certain cycle.

In one aspect, according to the disclosure, it is possible to effectively improve the reliability of the authentication process.

DETAILED DESCRIPTION

Figure 1:
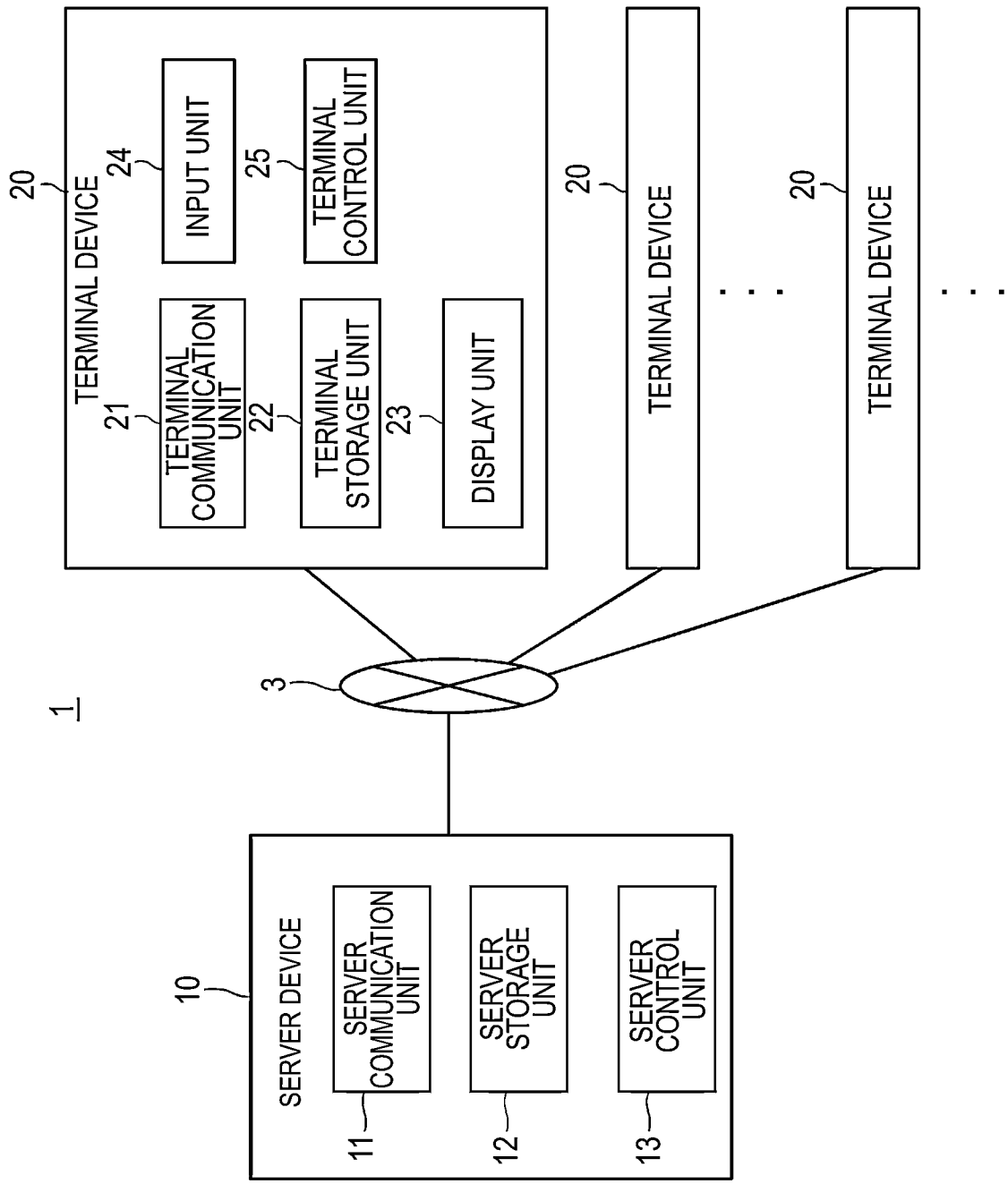
FIG. 1 is a block diagram of an authentication system according to an exemplary embodiment.

Hereinafter, each exemplary embodiment will be described in detail, with reference to the attached drawings. Note that, in the attached drawings, for readability, a reference numeral may be applied to only a part of a plurality of parts with the same attribute.

With reference to FIG. 1, the outline of an authentication system 1 according to one exemplary embodiment will be described. FIG. 1 is a block diagram of the authentication system 1 according to this embodiment.

The authentication system 1 may include a server device 10 and one or more terminal devices 20. For simplicity, in FIG. 1, three terminal devices 20 are illustrated, but the number of terminal devices 20 may be more or fewer than three.

The server device 10, for example, may be an information processing system such as a server, which may be managed by an administrator providing one or more authentication services. The terminal device 20, for example, may be a device such as a mobile phone, a smart phone, a tablet terminal, a personal computer (PC), a head mounted display, or a game device, which may be used by a user. A plurality of terminal devices 20 can be connected to the server device 10 through a network 3, typically in a different manner for each user.

The terminal device 20 may be capable of executing an authentication service application according to this embodiment. The authentication service application may be received by the terminal device 20 from the server device 10 or a predetermined application distribution server through the network 3, or may be stored in advance in a storage device provided in the terminal device 20 or a storage medium such as a memory card, which may be readable by the terminal device 20. The server device 10 and the terminal device 20 may be connected through the network 3 such that communication is available. For example, the server device 10 and the terminal device 20 may execute various processing pieces relevant to an authentication service in cooperation.

Note that, the network 3 may include a wireless communication network, the internet, a virtual private network (VPN), a wide area network (WAN), a wired network, any combination thereof, or the like.

Hereinafter, the authentication system 1 may implement an example of the information processing system, each element of one specific terminal device 20 (refer to a terminal communication circuit 21 to a terminal control circuit 25 in FIG. 1) may implement an example of the information processing system, or the plurality of terminal devices 20 may implement an example of the information processing system in cooperation. In addition, the server device 10 may independently implement an example of the information processing system, or the server device 10 and one or more terminal devices 20 may implement an example of the information processing system in cooperation.

An exemplary embodiment of a configuration of the server device 10 will be described in detail. The server device 10 may include a server computer. In an exemplary embodiment, the server device 10 may be a plurality of server computers acting in cooperation. For example, the server device 10 may be implemented as a server computer providing various contents (for example, time information), a server computer implementing an authentication server, and the like, in cooperation. In addition, the server device 10 may include a Web server. In this case, a part of the functions of the terminal device 20 described below may be implemented as a browser processing an HTML document received from the Web server, or various attendant programs thereof (for example, JAVASCRIPT).

As illustrated in FIG. 1, the server device 10 may include a server communication circuit 11, a server storage unit 12, and a server control circuit 13.

The server communication circuit 11 may include an interface that communicates with an external device in a wireless or wired manner, and transmits and receives information. The server communication circuit 11, for example, may include a wireless local area network (LAN) communication module, a wired LAN communication module, or the like. The server communication circuit 11 may be capable of transmitting and receiving information with respect to the terminal device 20 through the network 3.

The server storage unit 12, for example, may be a storage device, and may store various information pieces and programs required for various processing pieces according to authentication service.

The server control circuit 13 may include a central processing unit (CPU), a graphics processing unit (GPU), and the like, which implement a specific function by reading a dedicated microprocessor or a specific program. For example, the server control circuit 13 may execute the authentication service application in accordance with a user manipulation with respect to a display circuit 23 (a touch panel) of the terminal device 20, in cooperation with the terminal device 20.

The configuration of the terminal device 20 will be described. As illustrated in FIG. 1, the terminal device 20 may include a terminal communication circuit 21, a terminal storage unit 22, a display circuit 23, an input circuit 24, and a terminal control circuit 25.

The terminal communication circuit 21 may include an interface that communicates with an external device in a wireless or wired manner, and transmits and receives information. The terminal communication circuit 21, for example, may include a wireless communication module, a wireless LAN communication module, a wired LAN communication module, or the like corresponding to a mobile communication standard such as LONG TERM EVOLUTION (LTE), LTE-advanced (LTE-A), the fifth-generation mobile communication system, and ultra mobile broadband (UMB). The terminal communication circuit 21 may be capable of transmitting and receiving information with respect to the server device 10 through the network 3.

The terminal storage unit 22, for example, may include a primary storage device and a secondary storage device. For example, the terminal storage unit 22 may include a semiconductor memory, a magnetic memory, an optical memory, or the like. The terminal storage unit 22 may store various information pieces and programs that may be received from the server device 10 and used in authentication service-relevant processing. The information and the program used in the authentication service-relevant processing may be acquired from an external device through the terminal communication circuit 21. For example, an authentication service application program may be acquired from a predetermined application distribution server. Hereinafter, the application program may be simply referred to as an application or an app.

The display circuit 23, for example, may include a display device such as a liquid crystal display or an organic electroluminescence (EL) display. The display circuit 23 may be capable of displaying various images. The display circuit 23, for example, may include a touch panel, and may function as an interface detecting various user manipulations. Note that, the display circuit 23 may be embedded in the head mounted display as described above.

The input circuit 24 may include a physical key, and may further include any input interface including a pointing device such as a mouse.

The terminal control circuit 25 may include one or more processors. The terminal control circuit 25 may control the operation of the entire terminal device 20.

The terminal control circuit 25 may transmit and receive information through the terminal communication circuit 21. For example, the terminal control circuit 25 may receive various information pieces and programs used in the authentication service-relevant processing from at least one of the server device 10 and another external server. The terminal control circuit 25 may store the received information and program in the terminal storage unit 22. For example, the terminal storage unit 22 may store a browser (an internet browser) for connection to the Web server.

Next, with reference to FIG. 2 and the subsequence, operation examples of the authentication system 1 will be described.

Figure 2:
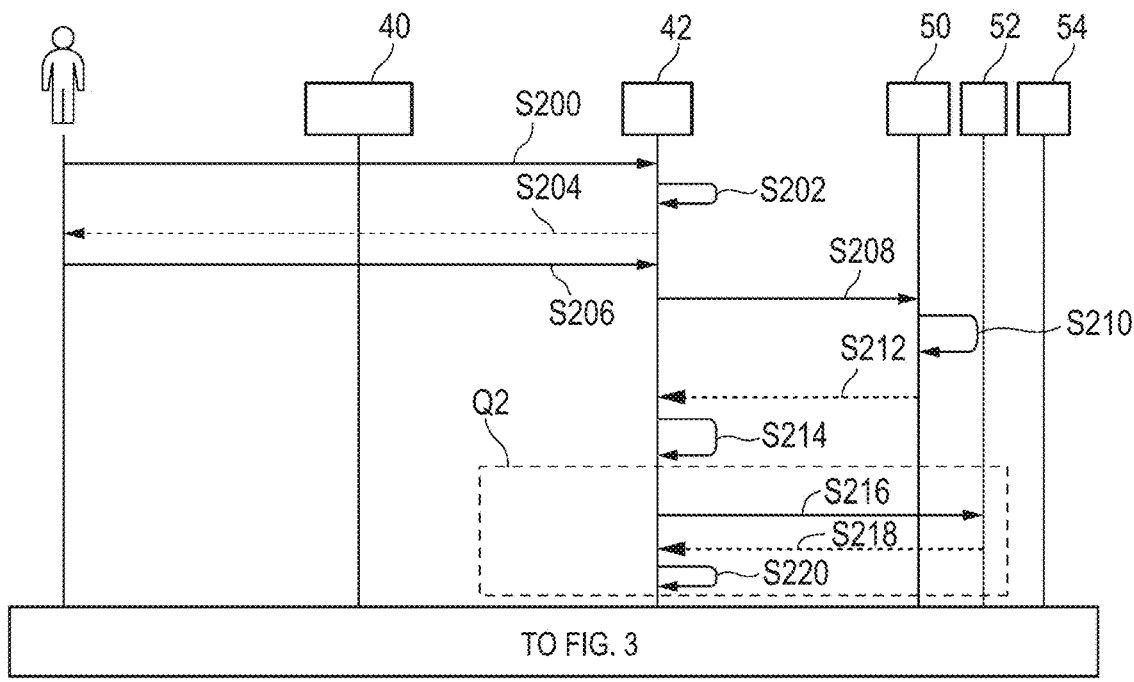
FIG. 2 is a (first) timing chart illustrating an operation example of the authentication system.
Figure 3:
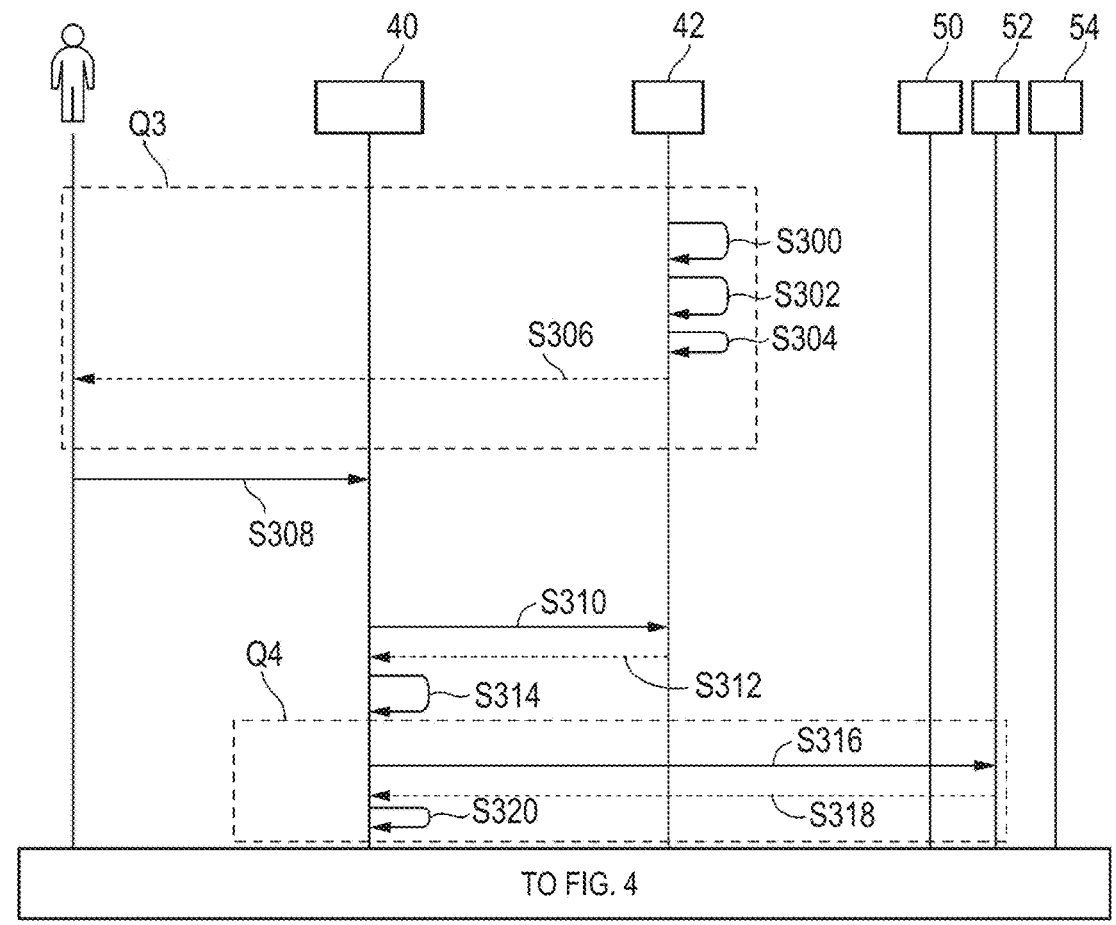
FIG. 3 is a (second) timing chart illustrating an operation example of the authentication system.
Figure 4:
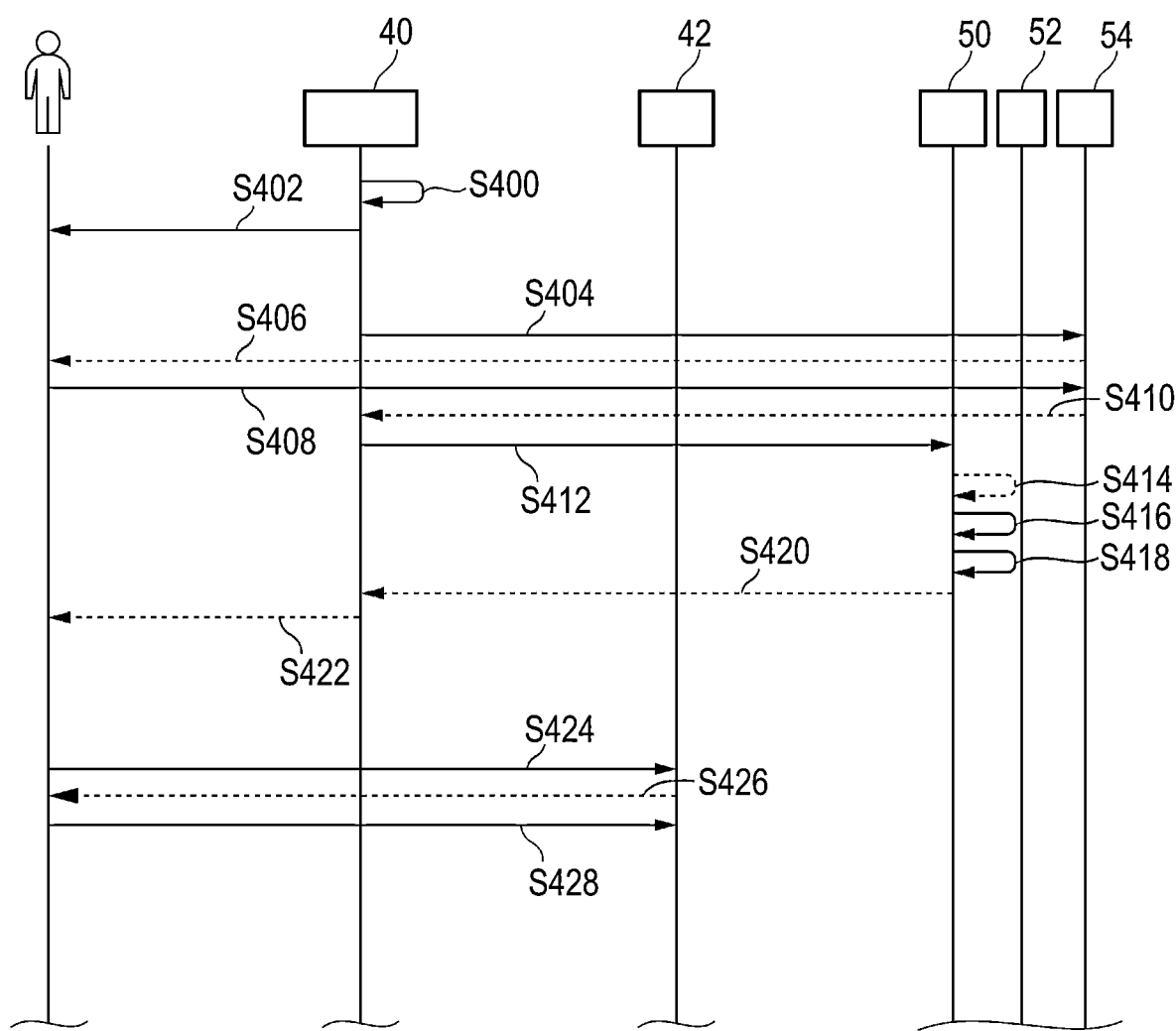
FIG. 4 is a (third) timing chart illustrating an operation example of the authentication system.

FIG. 2 to FIG. 4 may be timing charts illustrating the operation example of the authentication system 1. FIG. 2 to FIG. 4 may be a set of operation examples, but only a part thereof may be executed. In addition, in FIG. 2 to FIG. 4, an authentication side information terminal 40, an authenticated side information terminal 42, an authentication server 50, an NTP server 52, and a content server 54 appear in addition to the user.

The authentication side information terminal 40 and the authenticated side information terminal 42 may be implemented respectively by the terminal device 20 illustrated in FIG. 1. The authentication server 50 and the content server 54 may include one or more server devices 10 illustrated in FIG. 1. Accordingly, in this case, in FIG. 2 to FIG. 4, the authentication system 1 may be or may include the authentication side information terminal 40, the authenticated side information terminal 42, the authentication server 50, and the content server 54. Note that, in a modification example, the authentication system 1 may be or may include the authentication side information terminal 40, the authenticated side information terminal 42, and the authentication server 50.

Here, as an example, an operation example relevant to a game application will be described. The game app may be installed in the authenticated side information terminal 42. In this embodiment, the game app may include an app part for an authenticated side in the authentication service application, but apps different from each other may be in cooperation. The authentication side information terminal 40 and the authentication server 50 may include an app part for an authentication side in the authentication service app.

In the sequential description provided in the exemplary embodiment shown in FIG. 2, first, the user may activate the game app on the authenticated side information terminal 42 (step S200). That is, the terminal control circuit 25 of the authenticated side information terminal 42, for example, may activate the game application in accordance with the manipulation of the user. The terminal control circuit 25 may execute the authentication service-relevant processing in cooperation with the server device 10. For example, the terminal control circuit 25 of the authenticated side information terminal 42, for example, may output a graphic user interface (GUI) detecting the user manipulation on a screen of the display circuit 23. The terminal control circuit 25 may be capable of detecting the user manipulation through the input circuit 24. For example, the terminal control circuit 25 may be capable of detecting various manipulations by the gesture of the user (manipulations corresponding to a tap manipulation, a long tap manipulation, a click manipulation, a swipe manipulation, and the like).

The authenticated side information terminal 42 may execute the following processing, on the basis of the activated game application. That is, the activated game application may be executed on the authenticated side information terminal 42, and thus, various operations of the authenticated side information terminal 42 described below may be implemented. First, in the game app of the authenticated side information terminal 42, an authentication service app part may generate a key pair (step S202), and may perform top screen display on the display circuit 23 of the authenticated side information terminal 42 (step S204). The generation of the key pair may be executed in a case where OAuth authentication may be used. In this case, the key pair may be used when generating OAuth signature.

The user may perform input for a predetermined request (hereinafter, also referred to as "predetermined request input") through the input circuit 24 in an output state of a top screen of the authenticated side information terminal 42 (step S206). The predetermined request may be random, but here, may be a data transfer request according to a model change or the like, and for example, a data transfer request of the game app. In another embodiment, the predetermined request may be the sharing of authentication information in a plurality of terminals. Note that, such sharing may be processing for enabling the same or similar service to be used in the plurality of terminals with the same account.

In the game app of the authenticated side information terminal 42, the authentication service app part may request a one-time token for authentication (an example of the authentication information) according to this predetermined request, in response to the predetermined request input of the user (step S208).

The authentication server 50 may generate the one-time token, in response to the request of the one-time token (step S210). An expiration date of the one-time token (an example of a first expiration date) may be an expiration date from the current time point, and any length thereof (an example of a first length), for example, may be approximately 5 minutes.

In a case where the one-time token is generated, the authentication server 50 may transmit the generated one-time token to the authenticated side information terminal 42 that may be a request source (step S212).

In the game app of the authenticated side information terminal 42, in a case where the one-time token is received from the authentication server 50, the authentication service app part may add predetermined information to the one-time token (step S214). The predetermined information may be any arbitrary information, and for example, may represent an action (for example, login) which may be performed when authentication is successful. In this case, the predetermined information may be different in accordance with the action. In addition, the predetermined information may be given to check data integrity or the like between user devices by giving data (other than the check of a real-time expiration date according to this authentication service described below), or to transfer data required for processing on a client side. Hereinafter, as described above, authentication information in which the predetermined information is given to the one-time token will also be referred to as "predetermined authentication information". Note that, in a modification example, the predetermined information may be omitted.

Then, in the game app of the authenticated side information terminal 42, the authentication service app part may execute time synchronization processing (refer to Q2) for acquiring accurate time information. Specifically, first, the authenticated side information terminal 42 may transmit a request for current time information to the NTP server 52 (step S216). The NTP server 52 may transmit the time information to the authenticated side information terminal 42 that is the request source, in response to the request (step S218). In a case where the time information is received from the NTP server 52, the authenticated side information terminal 42 synchronizes time information in the authenticated side information terminal 42 with the received time information (step S220). By performing such time synchronization processing, the authenticated side information terminal 42 may be capable of generating the time information synchronized with the NTP server 52 until at least a certain period of time has elapsed after receiving the time information from the NTP server 52. Note that, the authenticated side information terminal 42 may periodically execute the time synchronization processing in advance. In this case, the time synchronization processing may be omitted, and the process may proceed to step S300.

In the game app of the authenticated side information terminal 42, in a case where the time synchronization processing (refer to Q2) may be completed, as illustrated in FIG. 3, the authentication service app part may subsequently execute two-dimensional code generation/update processing (refer to Q3).

The two-dimensional code generation/update processing may be repeatedly executed for each certain cycle $\Delta T1$. The two-dimensional code generation/update processing may be executed with respect to one one-time token within an expiration date of the one one-time token. The certain cycle $\Delta T1$ may be significantly shorter than the length of the expiration date of the one-time token. Here, "significantly" shorter (or longer), for example, may indicate a level with a different order. For example, in a case where the length of the expiration date of the one-time token may be approximately 5 minutes, the certain cycle $\Delta T1$ may be 0 seconds to 10 seconds, and preferably may be approximately 0.1 seconds.

In the two-dimensional code generation/update processing, the authenticated side information terminal 42 may add a new expiration date (hereinafter, also referred to as a "real-time expiration date") to the predetermined authentication information (step S300). The real-time expiration date may be an expiration date from the current time point, and in this case, the current time point may be a time point based on the time information. Note that, in the authenticated side information terminal 42, the time information may be updated in an extremely short cycle according to a clock frequency of the authenticated side information terminal 42, or the like. For example, in the authenticated side information terminal 42, the time information may be updated in a cycle shorter than or equal to the certain cycle $\Delta T1/10$. Here, the time information may represent a different time when performing the two-dimensional code generation/update processing for each certain cycle $\Delta T1$.

The length (an example of a second length) of the real-time expiration date (an example of a second expiration date) may be significantly shorter than the length of the expiration date of the one-time token. In addition, the length of the real-time expiration date may be the certain cycle $\Delta T1$ or longer. For example, in a case where the length of the expiration date of the one-time token is approximately 5 minutes, the length of the real-time expiration date may be 0.1 seconds to 10 seconds, and preferably may be approximately 0.5 seconds.

Then, the authenticated side information terminal 42 may generate two-dimensional code data, on the basis of the predetermined authentication information with the real-time expiration date (step S302). The encoded two-dimensional code data may be generated by encoding the predetermined authentication information with the real-time expiration date.

Then, the authenticated side information terminal 42 may generate two-dimensional code image data, on the basis of the two-dimensional code data (step S304).

As described above, in the game app of the authenticated side information terminal 42, the authentication service app part may generate the two-dimensional code image data (an example of an authentication code) including the real-time expiration date based on the time point for each certain cycle ΔT1.

In this embodiment, since the two-dimensional code image (and the two-dimensional code data derived therefrom) may be updated on the authenticated side information terminal 42 side but not the authentication server 50, communication between the authentication server 50 and the authenticated side information terminal 42 may not be required. Accordingly, it may be possible to reduce a communication load, and to perform high-speed update (generation for each certain cycle ΔT1) of the two-dimensional code image.

In a case where the two-dimensional code image data is generated, the authenticated side information terminal 42 may output the two-dimensional code image based on the generated two-dimensional code image data onto the display circuit 23 (step S306). Accordingly, the user may be capable of visually recognizing the two-dimensional code image through the display circuit 23. Note that the two-dimensional code image may be in any form, and, for example, may be in the form of a QR CODE or the like.

In this embodiment, as described above, since the two-dimensional code image data may be changed for each certain cycle ΔT1, the two-dimensional code image (and the real-time expiration date) displayed on the display circuit 23 of the authenticated side information terminal 42 may also be changed for each certain cycle ΔT1.

The user allows the authentication side information terminal 40 to read out the two-dimensional code image displayed on the display circuit 23 of the authenticated side information terminal 42 (step S308). The authentication side information terminal 40 may read out the two-dimensional code image, and thus may acquire the two-dimensional code data according to the two-dimensional code image (step S310 and step S312). The authentication side information terminal 40 may decode the two-dimensional code data (step S314), and thus, may acquire the predetermined authentication information with the real-time expiration date described above.

Here, in this embodiment, as described above, the two-dimensional code image displayed on the display circuit 23 of the authenticated side information terminal 42 may be changed for each certain cycle ΔT1, but the authentication side information terminal 40 may be capable of acquiring the predetermined authentication information with the real-time expiration date described above, on the basis of the two-dimensional code image displayed on the authenticated side information terminal 42 at a read-out time point.

As described above, in a case where the predetermined authentication information with the real-time expiration date is acquired, the authentication side information terminal 40 may execute the time synchronization processing (refer to Q4) for acquiring accurate time information. Specifically, first, the authentication side information terminal 40 may transmit a request for the current time information to the NTP server 52 (step S316). The NTP server 52 may transmit the time information to the authentication side information terminal 40 that may be the request source, in response to the request (step S318). In a case where the time information is received from the NTP server 52, the authentication side information terminal 40 may synchronize time information in the authentication side information terminal 40 with the received time information (step S320). By performing such time synchronization processing, the authentication side information terminal 40 may be capable of generating the time information synchronized with the NTP server 52 until at least a certain period of time has elapsed after receiving the time information from the NTP server 52. Note that the authentication side information terminal 40 may periodically execute the time synchronization processing in advance. In this case, the time synchronization processing may be omitted, and the process may proceed to step S400.

In a case where the predetermined authentication information with the real-time expiration date is acquired, the authentication side information terminal 40 may check the real-time expiration date (step S400), and then, may display a login check screen in a case where the real-time expiration date has not expired (step S402). In addition, the authentication side information terminal 40 may transmit an output request for screen display of biometric authentication and passcode authentication on the authenticated side information terminal 42 to the content server 54 (step S404). Note that, in a case where the real-time expiration date has expired, the authentication side information terminal 40 may not proceed to the processing subsequent to step S402. In this case, starting over from the middle, such as starting over from step S308, may be suitably available.

The content server 54 may present the screen display of the biometric authentication and the passcode authentication to the user through the authenticated side information terminal 42, in response to such an output request (step S406). The user may input information for the biometric authentication and the passcode authentication (step S408), and in a case where an authentication result is successful, a notification to such an effect may be transmitted to the authentication side information terminal 40 from the content server 54 (step S410).

In a case where the notification is received, the authentication side information terminal 40 may transmit the predetermined authentication information with the real-time expiration date that may be acquired as described above to the authentication server 50 (step S412). In the case of the predetermined authentication information that is transmitted to the authentication server 50, the predetermined authentication information with the real-time expiration date may not include the predetermined information described above. That is, the predetermined authentication information with the real-time expiration date may be information including the original one-time token and the real-time expiration date.

Note that, in the example illustrated in FIG. 2 to FIG. 4, the authentication side information terminal 40 may check the real-time expiration date (step S400), but the check of the real-time expiration date by the authentication side information terminal 40 may be omitted. In addition, as with the example illustrated in FIG. 2 to FIG. 4, in a case where the check of the real-time expiration date by the authentication side information terminal 40 is executed, update (extension) processing of the real-time expiration date may be executed by the authentication side information terminal 40 when the real-time expiration date is valid as a result of the check. Such update can be valid in a case where the length of the real-time expiration date may be comparatively short.

In a case where the predetermined authentication information with the real-time expiration date is received, the authentication server 50 may determine the validity of the received predetermined authentication information with the real-time expiration date (accordingly, the validity of the two-dimensional code image according to the predetermined authentication information) (step S414 and step S416). In this case, the authentication server 50 may determine the validity of the two-dimensional code image, on the basis of both expiration dates of the expiration date of the one-time token according to the two-dimensional code image and the real-time expiration date according to the two-dimensional code image. Specifically, whether both expiration dates have expired may be determined on the basis of the time information at the current time point. In a case where both expiration dates have not expired, the authentication may be successful. In this case, processing corresponding to a predetermined request may be executed (step S418). In this embodiment, the authentication server 50 may execute data transfer processing of the game app. In addition, the authentication server 50 may provide a notification to the authentication side information terminal to the effect that the authentication is successful (step S420). In a case where such a notification may be received, the authentication side information terminal 40 may provide a notification to the user to the effect that login is successful (step S422).

The user may return the screen on the authenticated side information terminal 42 to the top screen (step S424), and may display the top screen (step S426). Then, the user may start the game app (step S428).

As described above, according to this embodiment, since the expiration date according to the one-time token and the real-time expiration date may be considered, it may be possible to improve the reliability of the authentication. That is, by also using the real-time expiration date, which may have a comparatively short length, substantially starting from when reading out the two-dimensional code image, it may be possible to effectively prevent spoofing.

For example, a case may be assumed in which a user A captures the two-dimensional code image displayed on the display circuit 23 of the own terminal device 20 with a screenshot, and may transmit the two-dimensional code image to a user B. In this case, a possibility that the real-time expiration date may expire before the two-dimensional code image reaches the authentication server 50 increases due to time from when the two-dimensional code image may be generated to when the user B may acquire and may read out the two-dimensional code image. This may be particularly preferable in a case where the length of the real-time expiration date is extremely short.

In addition, as described above, in this embodiment, since the high-speed update of the two-dimensional code image by the authenticated side information terminal 42 can be performed, there may be no influence such as a communication delay due to the communication between the authentication server 50 and the authenticated side information terminal 42. Accordingly, it may also be possible to reduce problems (a possibility that the convenience of the user may be impaired) such as an authentication failure within the expiration date due to the communication delay.

Note that, in the example described above with reference to FIG. 2 to FIG. 4, it may be assumed that the authentication side information terminal 40 may be used by the same user as the user of the authenticated side information terminal 42, but various relationships between the user of the authentication side information terminal 40 and the user of the authenticated side information terminal 42 can be contemplated, in accordance with an authentication usage or the like.

In addition, in the example described above with reference to FIG. 2 to FIG. 4, as the authentication side information terminal 40, for example, a mobile terminal device 20 (for example, a smart phone) may be preferable, and as the authenticated side information terminal 42, for example, a stationary terminal device 20 (for example, a desktop computer) may be preferable, but various forms of the authentication side information terminal 40 and/or the authenticated side information terminal 42 can be contemplated, in accordance with usage. For example, the authentication side information terminal 40 may be a fixed terminal fixed at a predetermined position. In this case, being authenticated through the authentication side information terminal 40 may be used to prove that the user of the authenticated side information terminal 42 may be at the predetermined position at that time. Such a usage may be preferable for attendance check, novelty or item distribution in an event venue, and the like.

In addition, in the example described above with reference to FIG. 2 to FIG. 4, step S402 to step S410 may be executed due to the characteristics of a usage (a predetermined request) such as data transfer, but in other usages, step S402 to step S410 may be omitted.

In addition, in the example described above with reference to FIG. 2 to FIG. 4, the real-time expiration date may be considered together with the expiration date according to the one-time token, but the expiration date according to the one-time token may be omitted.

In addition, the example described above with reference to FIG. 2 to FIG. 4 may be an application example in a real space, and can also be applied to an event in a virtual space, or the like. Note that, in the case of the virtual space, the authentication side information terminal 40 may similarly be a fixed terminal fixed at a predetermined position, but may be substantially implemented by the server device 10 on a management side of the virtual space. That is, in the case of the virtual space, the authentication side information terminal 40 and the authentication server 50 may be integrally implemented.

In addition, in the case of the virtual space, various methods for the user to hold the authentication side information terminal 40 to read out the two-dimensional code image can be contemplated, and such a method may simply be a method only for applying a read-out instruction in the vicinity of the position of the authentication side information terminal 40, or may be a method for a display screen of the authenticated side information terminal 42 in the form of a smart phone or the like in the virtual space to be directed toward the authentication side information terminal 40, as with the real space.

Note that, in the example described above with reference to FIG. 2 to FIG. 4, the authenticated side information terminal 42 may execute the processing of step S212 in FIG. 2, and thus, an example of an "authentication information acquisition circuit" or an "acquisition circuit on an authenticated side" described in the claims may be implemented, the authenticated side information terminal 42 may execute the processing of step S300 in FIG. 3, and thus, an example of a "code update circuit" described in the claims may be implemented, and the authenticated side information terminal 42 may execute the processing of step S208 in FIG. 2, and thus, an example of an "authentication information request circuit" described in the claims may be implemented.

In addition, in the example described above with reference to FIG. 2 to FIG. 4, the authentication side information terminal 40 may execute the processing of step S310 and step S312 in FIG. 3, and thus, an example of a "code acquisition circuit" or an "acquisition circuit on an authentication side" described in the claims may be implemented, and the authentication side information terminal 40 may execute the processing of step S400 in FIG. 4 and/or the authentication server 50 may execute the processing of step S414 and step S416 in FIG. 4, and thus, an example of a "determination circuit" described in the claims may be implemented. In addition, the authentication server 50 may execute the processing of step S210 and step S212 in FIG. 2, and thus, an example of an "authentication information issuing circuit" described in the claims may be implemented, and the authentication server 50 may execute the processing of step S418 in FIG. 4, and thus, an example of a "processing execution circuit" described in the claims may be implemented.

Each embodiment has been described in detail, but the disclosure may be not limited to a specific embodiment, and various modifications and changes can be made within the scope described in the claims. In addition, all or a plurality of configuration elements of the embodiment described above can also be combined.

For example, in the embodiment described above, the authentication code in the form of the two-dimensional code image may be used, but other codes such as a one-dimensional code image may be used, instead of the two-dimensional code image. In this case, the other codes may be readable by any reading terminal using radio frequency identification (RFID) or the like. Alternatively, an image recognizable random numerical sequence or the like may be used as the authentication code, instead of the two-dimensional code image.

In addition, in the embodiment described above, the two-dimensional code image (and the two-dimensional code data derived therefrom) may be updated on the authenticated side information terminal 42 side but not the authentication server 50, but may be updated on the authentication server 50 side. In this case, it may be possible to effectively reduce a possibility of a falsification or the like on the authenticated side information terminal 42 side.

REFERENCE SIGNS LIST

1 authentication system
3 network
10 server device
11 server communication circuit
12 server storage unit
13 server control circuit
20 terminal device
21 terminal communication circuit
22 terminal storage unit
23 display circuit
24 input circuit
25 terminal control circuit
40 authentication side information terminal (information processing device, second information processing device)
42 authenticated side information terminal (information processing device, first information processing device)
50 authentication server (information processing device, second information processing device)
52 NTP server
54 content server

The invention claimed is:

1. A method of improving authentication reliability, comprising steps of:
receiving predetermined input of a user, and, in response to the predetermined input of the user, requesting authentication information,
acquiring, on an information processing device, the authentication information;
continuously and automatically updating an authentication code in real time with a code update circuit, wherein said authentication code is, for a certain cycle in a plurality of cycles, readable from a device external to the information processing device or transmittable to the device external to the information processing device, on the basis of the authentication information, and further on the basis of time information changed in an update cycle shorter than or equal to the certain cycle; and
displaying the updated authentication code on a display circuit of the user,
wherein acquiring the authentication information comprises acquiring the authentication information from an external server in the form of a one-time token including a first expiration date based on a time length of the certain cycle; and
wherein the authentication code includes a second expiration date corresponding to a time length on the basis of an update time point of the code update circuit;
wherein the time length of the update cycle is shorter than or equal to the time length of the certain cycle.

2. The method according to claim 1,
wherein the certain cycle is 1 second or shorter.

3. The method according to claim 1,
wherein a time length of the certain cycle is shorter than the second time length.

4. The method according to claim 1,
further comprising determining validity of the authentication information on the basis of both the first expiration date and the second expiration date.

5. The method according to claim 4,
wherein determining validity on the basis of the second expiration date is executed on the basis of time information on an authentication side.

6. The method according to claim 1,
further comprising generating the authentication code on the basis of data encoded on the basis of the authentication information and the time information.

7. The method according to claim 1,
wherein the authentication code is provided as a two-dimensional code image.

8. An information processing device, comprising a memory and processing circuitry, the processing circuitry configured to:
receive a predetermined input of a user, and, in response to the predetermined input of the user, request authentication information;
acquire an authentication code generated on the basis of authentication information, and time information changed in an update cycle shorter than or equal to a certain cycle;
determine validity of the authentication code, on the basis of the authentication code and the time information;
continuously and automatically update the authentication code in real time with a code update circuit; and
display the updated authentication code on a display circuit of the user;
wherein acquiring the authentication information comprises acquiring the authentication information from an external server in the form of a one-time token including a first expiration date based on a time length of the certain cycle; and
wherein the authentication code includes a second expiration date corresponding to a time length on the basis of an update time point of the code update circuit;
wherein the time length of the update cycle is shorter than or equal to the time length of the certain cycle.

9. The information processing device according to claim 8, wherein the processing circuitry is further configured to:

issue the authentication information in the form of a one-time token including a first expiration date based on a first time length.

10. The information processing device according to claim 9,
wherein the processing circuitry is further configured to issue the authentication information, on the basis of a request received from an authenticated side, and is configured to transmit the issued authentication information to the authenticated side and is configured to enable the authenticated side to generate the authentication code, on the basis of the authentication information.

11. The information processing device according to claim 9,
wherein the authentication code includes a second expiration date corresponding to a second time length, and the second time length is shorter than the first time length.

12. The information processing device according to claim 11,
wherein the processing circuitry is further configured to determine the validity of the authentication code, on the basis of both of the first expiration date and the second expiration date.

13. The information processing device according to claim 8, wherein the processing circuitry is further configured to:
execute corresponding predetermined processing, on the basis of a determination result of the processing circuitry indicating that the authentication code is valid.

14. An authentication system, comprising:
a first information processing device on an authenticated side; and
a second information processing device on an authentication side,
wherein the first information processing device comprises a memory and processing circuitry, the processing circuitry configured to:
acquire authentication information;
continuously and automatically update an authentication code for a certain cycle in a plurality of cycles, on the basis of the authentication information, and further on the basis of time information changed in an update cycle shorter than or equal to the certain cycle in real time with a code update circuit;
wherein the second information processing device comprises a second memory and second processing circuitry, the second processing circuitry configured to:
acquire the authentication code; and
determine validity of the authentication code, on the basis of the authentication code and the time information-; and
display the updated authentication code on a display circuit of a user;
wherein acquiring the authentication information comprises acquiring the authentication information from an external server in the form of a one-time token including a first expiration date based on a time length of the certain cycle; and
wherein the authentication code includes a second expiration date corresponding to a time length on the basis of an update time point of the code update circuit;
wherein the time length of the update cycle is shorter than or equal to the time length of the certain cycle.

15. A method of improving authentication reliability, comprising steps of:
receiving predetermined input of a user, and, in response to the predetermined input of the user, requesting authentication information,
acquiring, on an information processing device, from a server, an authentication code generated on the basis of authentication information and on the basis of time information changed in an update cycle shorter than or equal to a certain cycle;
upon receipt of the authentication code on the information processing device, determining validity of the authentication code on the basis of the authentication code and the time information;
continuously and automatically updating the authentication code in real time with a code update circuit; and
displaying the updated authentication code on a display circuit of the user.

16. A non-transitory computer-readable medium comprising program code that, when executed on a computer comprising a memory and processing circuitry, causes the computer to execute processing of:
receiving predetermined input of a user, and, in response to the predetermined input of the user, requesting authentication information,
acquiring an authentication code generated on the basis of authentication information, and time information changed in an update cycle shorter than or equal to a certain cycle; and
determining validity of the authentication code, on the basis of the authentication code and the time information.;
continuously and automatically updating the authentication code in real time with a code update circuit; and
displaying the updated authentication code on a display circuit of the user;
wherein acquiring the authentication information comprises acquiring the authentication information from an external server in the form of a one-time token including a first expiration date based on a time length of the certain cycle; and
wherein the authentication code includes a second expiration date corresponding to a time length on the basis of an update time point of the code update circuit;
wherein the time length of the update cycle is shorter than or equal to the time length of the certain cycle.

* * * * *